(12) United States Patent
Tremblay (10) Patent No.: US 9,451,018 B2
(45) Date of Patent: Sep. 20, 2016

(54) SCTP ENDPOINT MIGRATION (75) Inventor: Richard Tremblay, Rosemere (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1098 days.

(21) Appl. No.: 13/075,812

(22) Filed: Mar. 30, 2011

(65) Prior Publication Data
US 2012/0254384 A1 Oct. 4, 2012

(51) Int. Cl.
*G06F 15/16* (2006.01)
*H04L 29/08* (2006.01)

(52) U.S. Cl.
CPC ......... *H04L 67/1002* (2013.01); *H04L 67/148* (2013.01)

(58) Field of Classification Search
CPC .................................................. H04L 67/1002
USPC ........................................ 709/223, 224, 225
See application file for complete search history.

(56) References Cited

U.S. PATENT DOCUMENTS

| 6,850,503 B2 | 2/2005 | Dorenbosch et al. |
| 8,089,936 B2 * | 1/2012 | Watanabe ..................... 370/331 |
| 2006/0164974 A1 | 7/2006 | Ramalho et al. |
| 2010/0150161 A1 * | 6/2010 | Saksena et al. ............. 370/400 |

OTHER PUBLICATIONS

R.Stewart et al., Stream Control Transmission Protocol (SCTP) Dynamic Address Reconfiguration,Network Working Group ,RFC 5061, Sep. 2007,pp. 01-41.
PCT Search Report from corresponding application PCT/IB2012/051497.
R.Stewart, Stream Control Transmission Protocol,Network Working Group, RFC 4960, Sep. 2007,pp. 01-152.
L. Ong et al., An Introduction to the Stream Control Transmission Protocol (SCTP),Network Working Group, RFC 3286 , May 2002 ,pp. 01-10.
Patent publication CN101415006, Wang Hua, Thomson abstract, Apr. 22, 2009, pp. 1-5.

* cited by examiner

*Primary Examiner* — Adnan Mirza
(74) *Attorney, Agent, or Firm* — Coats & Bennett, P.L.L.C.

(57) ABSTRACT

An application is seamlessly migrated from one SCTP endpoint to another SCTP endpoint by determining if the application is to be migrated from a first SCTP endpoint associated with a second SCTP endpoint to a third SCTP endpoint, and migrating the application from the first SCTP endpoint to the third SCTP endpoint at the SCTP layer without packet loss occurring as a result of the migration.

27 Claims, 7 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Parameter Type = 0x0013       |         Parameter Length      |
+-+-+-+-+-+-+-+-+-+-+-+-+-+-+-+-+-+-+-+-+-+-+-+-+-+-+-+-+-+-+-+-+
/                   Migration Challenge Data                    /
+-+-+-+-+-+-+-+-+-+-+-+-+-+-+-+-+-+-+-+-+-+-+-+-+-+-+-+-+-+-+-+-+
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Parameter Type = 0x0014       |       Parameter Length = 4    |
+-+-+-+-+-+-+-+-+-+-+-+-+-+-+-+-+-+-+-+-+-+-+-+-+-+-+-+-+-+-+-+-+
```

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Parameter Type = 0x0015       |         Parameter Length      |
+-+-+-+-+-+-+-+-+-+-+-+-+-+-+-+-+-+-+-+-+-+-+-+-+-+-+-+-+-+-+-+-+
/                    ULP State Cookie Data                      /
+-+-+-+-+-+-+-+-+-+-+-+-+-+-+-+-+-+-+-+-+-+-+-+-+-+-+-+-+-+-+-+-+
```

SCTP ENDPOINT MIGRATION

TECHNICAL FIELD

The embodiments described herein generally relate to the Stream Control Transmission Protocol (SCTP), and particularly to seamlessly migrating an application from one endpoint to another endpoint using the SCTP layer.

BACKGROUND

The Stream Control Transmission Protocol (SCTP) is a transport layer protocol, serving in a similar role to the Transmission Control Protocol (TCP) and User Datagram Protocol (UDP). SCTP is message-oriented like UDP and ensures reliable, in-sequence transport of messages with congestion control like TCP. SCTP protocol was defined by the IETF Signaling Transport (SIGTRAN) working group in 2000, and is maintained by the IETF Transport Area (TSVWG) working group. RFC 4960 defines the protocol, and RFC 3286 provides an introduction.

SCTP is a reliable transport protocol operating on top of a connectionless packet network such as IP. SCTP is connection-oriented in nature, but the SCTP association is a broader concept than the TCP connection. Application data is transmitted in messages to the SCTP transport layer. SCTP places messages and control information into separate chunks (data chunks and control chunks), each identified by a chunk header. A message can be fragmented over a number of data chunks, each chunk containing data from one user message. SCTP chunks are bundled into SCTP packets. Each SCTP packet is submitted to the Internet Protocol (IP) layer, and includes a packet header, SCTP control chunks when necessary, and SCTP data chunks when available.

SCTP enables each SCTP endpoint (e.g. a client) to provide the other endpoint (e.g. a server) with a list of transport addresses (i.e. multiple IP addresses in combination with an SCTP port) through which the endpoint can be reached and from which the endpoint will originate SCTP packets. The association spans transfers over all of the possible source/destination combinations that may be generated from the list of each endpoint.

There may be times when the processing resources at one endpoint prevent or hinder the endpoint from successfully continuing its association with the application, and would be better to resume the association on another node where processing resources are available or simply when maintenance is scheduled on a node and migrating the association to a standby node is required. Such a migration should be performed in a controlled sequence in order to be transparent to the application at the non-moving end of the association.

In a typical scenario, a farm of similar servers can handle an association with any client. The workload is distributed amongst the serving nodes, but can be required to move some of the workload between serving nodes, therefore requiring existing SCTP associations to be moved seamlessly from the point of view of the client. Current SCTP migration techniques do not permit such seamless transition. Instead, the stationary client is typically aware that the application is moving. Also, packets are lost as a result of the migration process. Packet loss can reduce the quality of many types of applications, e.g. such as streaming video.

SUMMARY

According to embodiments described herein, an extension to SCTP allows an application at one end-point of an association to request to be migrated to another location in a controlled and seamless manner.

According to an embodiment of seamlessly migrating an application at one SCTP endpoint of an association to another SCTP endpoint, the migration includes determining the application is to be migrated from a first SCTP endpoint associated with a second SCTP endpoint to a third SCTP endpoint and migrating the application from the first SCTP endpoint to the third SCTP endpoint at the SCTP layer without packet loss occurring as a result of the migration.

According to an embodiment of a migrating SCTP endpoint, the migrating SCTP endpoint includes one or more processing circuits operable to associate the migrating SCTP endpoint with a non-migrating SCTP endpoint to support the application, determine the application is to be migrated from the migrating SCTP endpoint to a third SCTP endpoint, and migrate the application from the migrating SCTP endpoint to the third SCTP endpoint at the SCTP layer without packet loss occurring as a result of the migration.

According to an embodiment of a non-migrating SCTP endpoint, the non-migrating SCTP endpoint includes one or more processing circuits operable to associate the non-migrating SCTP endpoint with a migrating SCTP endpoint to support the application, receive a message indicating the application is to be migrated from the migrating SCTP endpoint to a third SCTP endpoint, and establish an association with the third endpoint so that the application is migrated from the migrating SCTP endpoint to the third SCTP endpoint at the SCTP layer without packet loss occurring as a result of the migration.

According to an embodiment of an SCTP endpoint, the SCTP endpoint includes one or more processing circuits operable to receive a message indicating the application is to be migrated from a migrating SCTP endpoint associated with a non-migrating SCTP endpoint to the SCTP endpoint and establish an association with the non-migrating endpoint so that the application is migrated from the migrating SCTP endpoint to the SCTP endpoint at the SCTP layer without packet loss occurring as a result of the migration.

Of course, the embodiments described herein are not limited to the features and contexts summarized above, and those familiar with precoding techniques will recognize additional features and contexts upon reading the following detailed description and upon viewing the accompanying drawings.

BRIEF DESCRIPTION OF THE DRAWINGS

The components in the figures are not necessarily to scale, instead emphasis being placed upon illustrating the principles of the embodiments described herein. Moreover, in the figures, like reference numerals designate corresponding parts. In the drawings.

DETAILED DESCRIPTION

Figure 1:
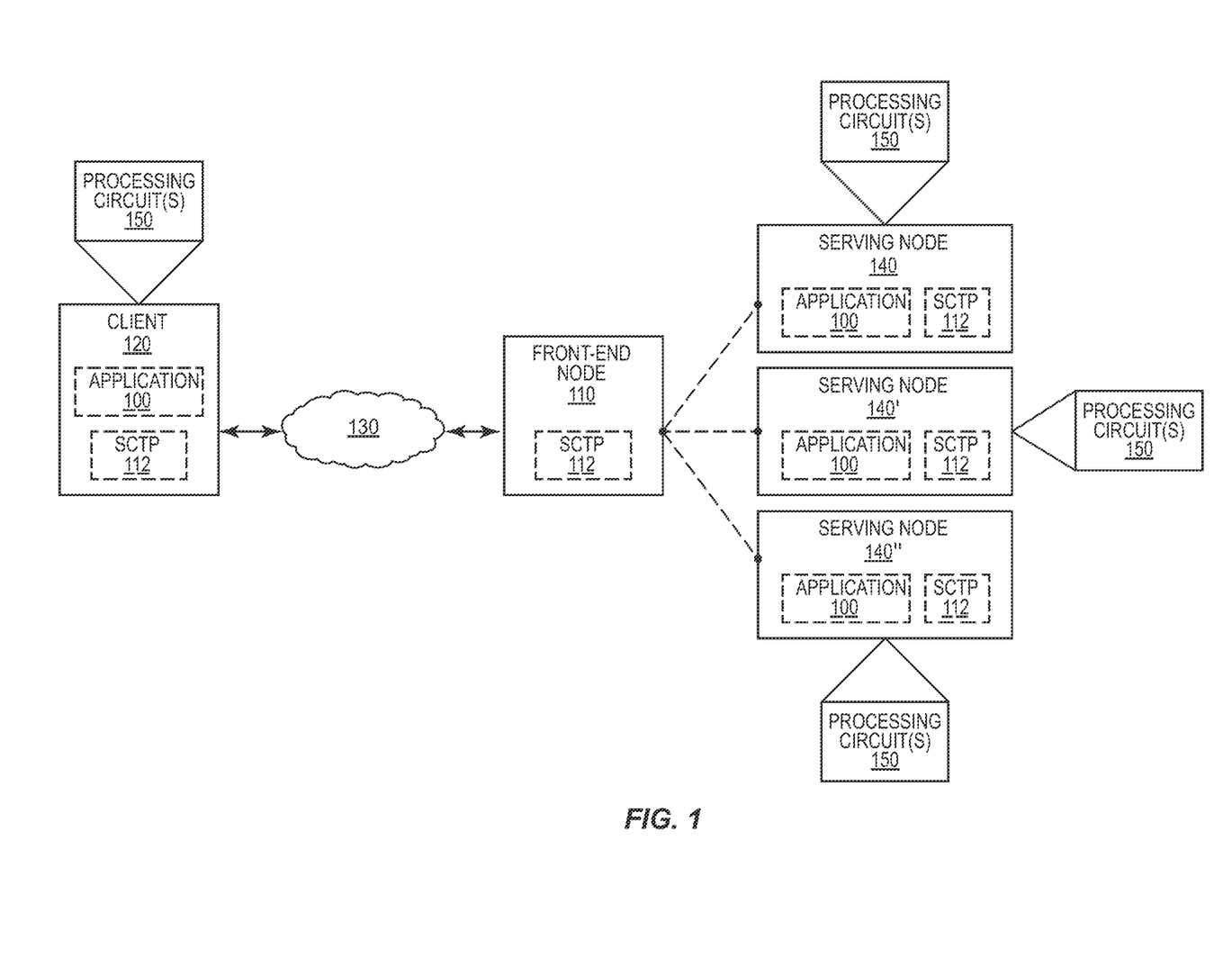
FIG. 1 illustrates an embodiment of a communication network including endpoints which form an association with one another to support an application using the SCTP layer.

FIG. 1 illustrates an embodiment of a communication network that includes SCTP endpoints which form an association with one another to support an application 100 using the SCTP layer 112. For example, a front-end node 110 of a service provider or other entity may establish a connection with a client 120 over a network 130 so that the client 120 can associate with one or more serving nodes 140 provided by the service provider or other entity using the SCTP layer 112. In this scenario, the client 120 and one of the serving nodes 140 are SCTP endpoints supporting the client application. The front-end node 110, client 120 and serving nodes 140 are each compliant with SCTP in order to form the connections and associations needed to support the application 100.

Workload can be distributed across the serving nodes 140, including the workload associated with the client application 100. It may be desirable or even required to move some of the workload between the serving nodes 140. Support for the client application 100 can be seamlessly moved in this way from the point of view of the client 120 using the SCTP layer 112 according to the embodiments described herein. As such, the application 100 at the client 120 is unaware of the migration performed at the other end. Also, packet loss does not occur as a result of the migration.

To support seamless migration of SCTP associations, each supporting SCTP endpoint includes one or more processing circuits 150 for providing the SCTP extensions and modifications described herein. As such, the respective processing circuit(s) 150 are compliant with RFC 4960 and any variants and/or offshoots thereof. The respective processing circuit(s) 150 can include any type of hardware and/or software suitable for implementing these procedures. For example, the respective processing circuit(s) 150 may include one or more baseband processors, microprocessors, microcomputers, digital signal processors (DSPs), special-purpose hardware, such as an application specific integrated circuit (ASIC) and programmable logic devices, controllers, memory, firmware, software, and/or any combination thereof.

Figure 2:
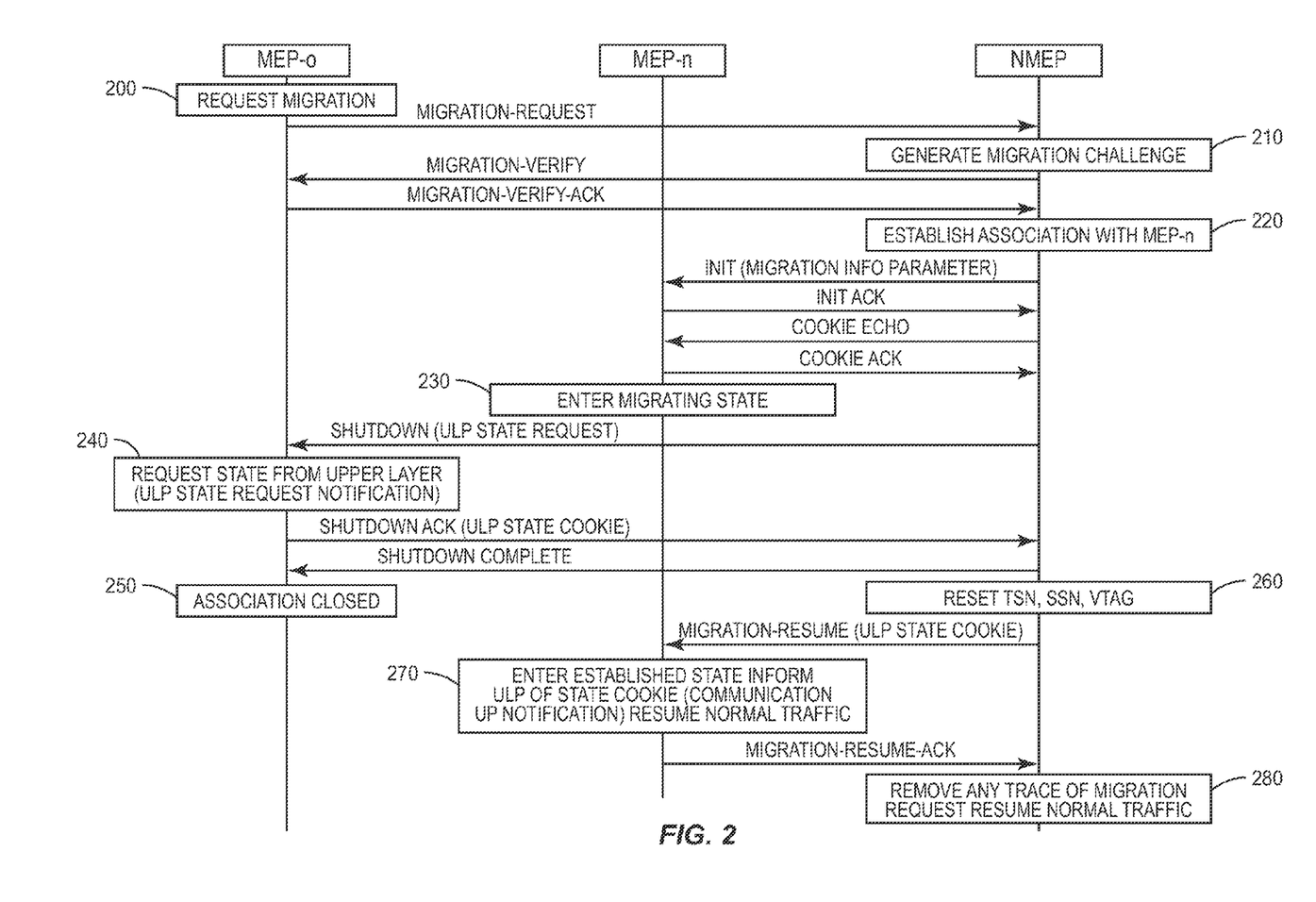
FIG. 2 illustrates an embodiment of seamlessly migrating a client application from one endpoint to another endpoint using the SCTP layer.

FIG. 2 illustrates an embodiment of seamlessly migrating a client application from one serving endpoint to another serving endpoint. In FIG. 2, the entity labeled 'MEP-o' is the current serving endpoint attempting to migrate the client application to another one of the serving endpoints. The entity labeled 'NMEP' is the client endpoint (which is not moving, at least in a logical sense), and the entity labeled 'MEP-n' is the serving endpoint to which MEP-o is attempting to migrate support for the client application. For example, NMEP may be the client 120 shown in FIG. 1, and MEP-o may be the serving node 140 presently associated with the client 120. MEP-n may be a different one of the serving nodes 140 shown in FIG. 1 to which the application is to be migrated.

Figure 9:
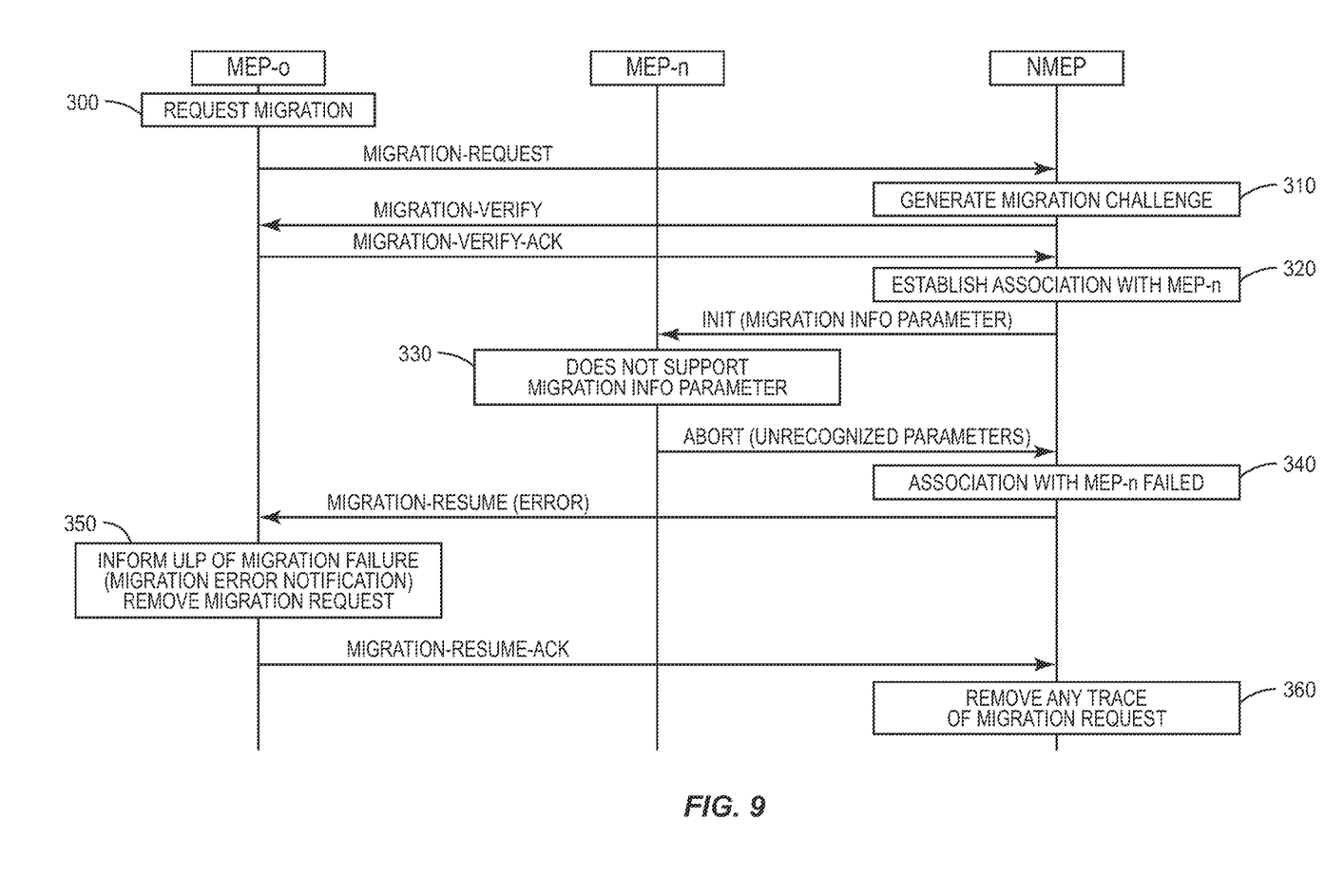
FIG. 9 illustrates an embodiment of handling an SCTP migration failure between migrating and non-migrating endpoints.
Figure 10:
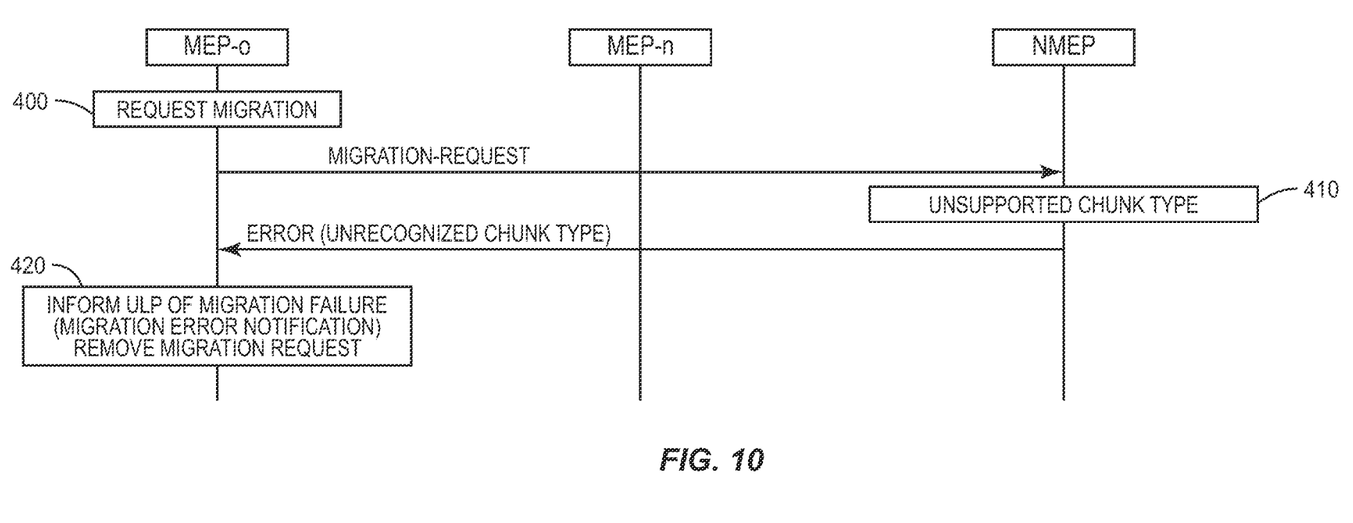
FIG. 10 illustrates an embodiment of handling an SCTP migration failure between a non-migrating endpoint and the new endpoint.

MEP-o determines the application is to be migrated from MEP-o to MEP-n e.g. in response to instructions from the application, ULP (upper layer protocol) or other entity. In response, MEP-o sends an SCTP migration request message to NMEP (FIG. 2, Step 200; FIG. 9, Step 300; FIG. 10, Step 400). The SCTP migration request message notifies NMEP of the migration and identifies MEP-n to NMEP. NMEP attempts to establish an association with MEP-n responsive to the SCTP migration request message (FIG. 2, Step 220; FIG. 9, 320). In one embodiment, NMEP sends an SCTP INIT chunk to MEP-n which includes information associated with the migration. If MEP-n recognizes the SCTP INIT chunk and is permitted to support the client application, an association can be established between NMEP and MEP-n. In one embodiment, this involves NMEP and MEP-n entering into a migrating state after the association is established between NMEP and MEP-n (FIG. 2, Step 230).

NMEP then sends an SCTP response such as an SCTP SHUTDOWN message to MEP-o which indicates whether NMEP successfully established an SCTP association with MEP-n in response to the initial SCTP migration request message sent by MEP-o. The SCTP association between MEP-o and NMEP is terminated if NMEP and MEP-n successfully established an SCTP association e.g. as indicated by the SCTP SHUTDOWN message (FIG. 2, Step 250). In one embodiment, NMEP and MEP-n then transition from the migrating state to an established state responsive to a migration resume chunk received at MEP-n which is sent by NMEP (FIG. 2, Step 270). The migration resume chunk indicates the SCTP association between MEP-o and NMEP has been terminated. Information associated with the application at MEP-o can be passed along to MEP-n during the migration process as described in more detail later herein so that this information can be provided to the application and or ULP at MEP-n. Regardless, the application has been seamlessly migrated from MEP-o to MEP-n at the SCTP layer without packet loss occurring as a result of the migration.

According to one embodiment, a new chunk type is defined which is used to enable the migration of an SCTP end-point. To limit the number of new chunk types, a single chunk type can be provided for identifying an SCTP migration and chunk flags can be used to differentiate the sequence of migration actions. Of course, additional chunk types can be defined to specify more of the migration actions. Table 1 below shows the new chunk type.

TABLE 1

New Chunk Type

| Chunk Type | Chunk Name |
|---|---|
| 0xC2 | Migration chunk (MIGRATION) |

Figure 3:
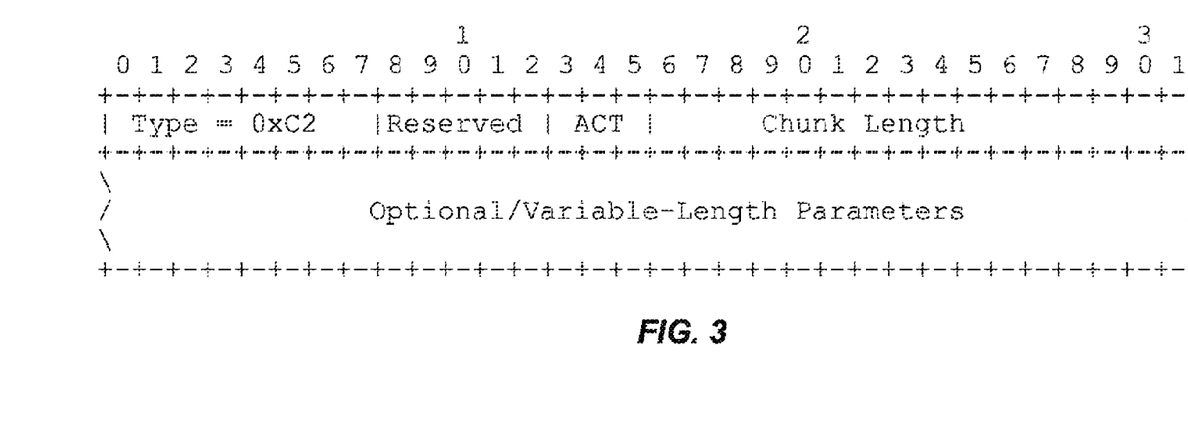
FIG. 3 illustrates an embodiment of an SCTP chunk which includes a migration chunk type indicating the chunk is a migration chunk.

FIG. 3 illustrates an SCTP chunk which includes the migration chunk type shown in Table 1 for indicating the chunk is a migration chunk. The SCTP MIGRATION chunk in FIG. 3 is used to control events during a migration sequence. In one embodiment, the migration chunk type is a 1 byte (unsigned integer) field which holds the IANA (Internet Assigned Numbers Authority) defined chunk type for the SCTP MIGRATION chunk. In one embodiment, the value is 0xC2 to indicate an SCTP migration.

The next 1 byte (unsigned integer) field of the SCTP MIGRATION chunk includes the chunk flags. The first 5 bits are reserved and can be set to 0 by the sender and ignored by the receiver. The following 3 'ACT' bits specify the action requested by the SCTP MIGRATION chunk. In one embodiment, '000' indicates a migration request message, '010' indicates a migration verify message, '011' indicates a migration verify acknowledgement message, '100' indicates a migration resume message and '101' indicates a migration resume acknowledge. The function and use of these different message types is explained in more detail later herein.

The next 2 byte (unsigned integer) field of the SCTP MIGRATION chunk holds the length in bytes of the chunk including the chunk type, flags and length fields. The SCTP MIGRATION chunk can include one or more optional/variable-length parameters. The parameters used inside the SCTP MIGRATION chunk are described in more detail next.

Figure 4:
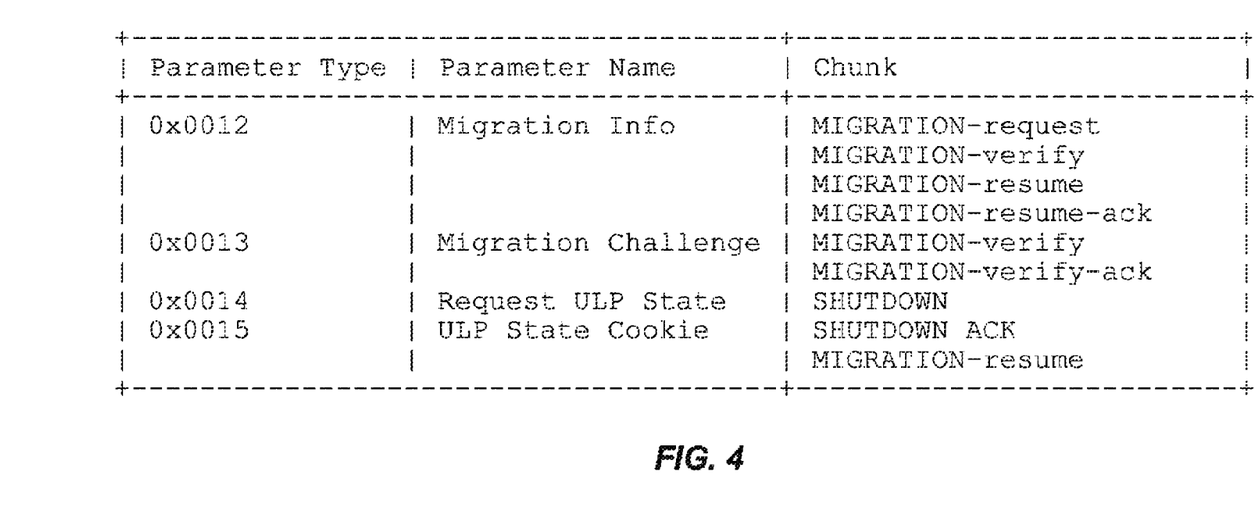
FIG. 4 illustrates an embodiment of the parameter types included in the SCTP MIGRATION chunk of FIG. 3.

FIG. 4 illustrates an embodiment of the different parameter types which can be included in the SCTP MIGRATION chunk. These parameters types are used to enable the SCTP migration. The first parameter type is a migration information parameter which contains the location of the new endpoint, e.g. one of the serving nodes 140 in FIG. 1 or MEP-n in FIG. 2. The migration information parameter is used inside the MIGRATION-request, MIGRATION-verify, MIGRATION-resume and MIGRATION-resume-acknowledge chunks e.g. as shown in FIG. 2.

Figure 5:
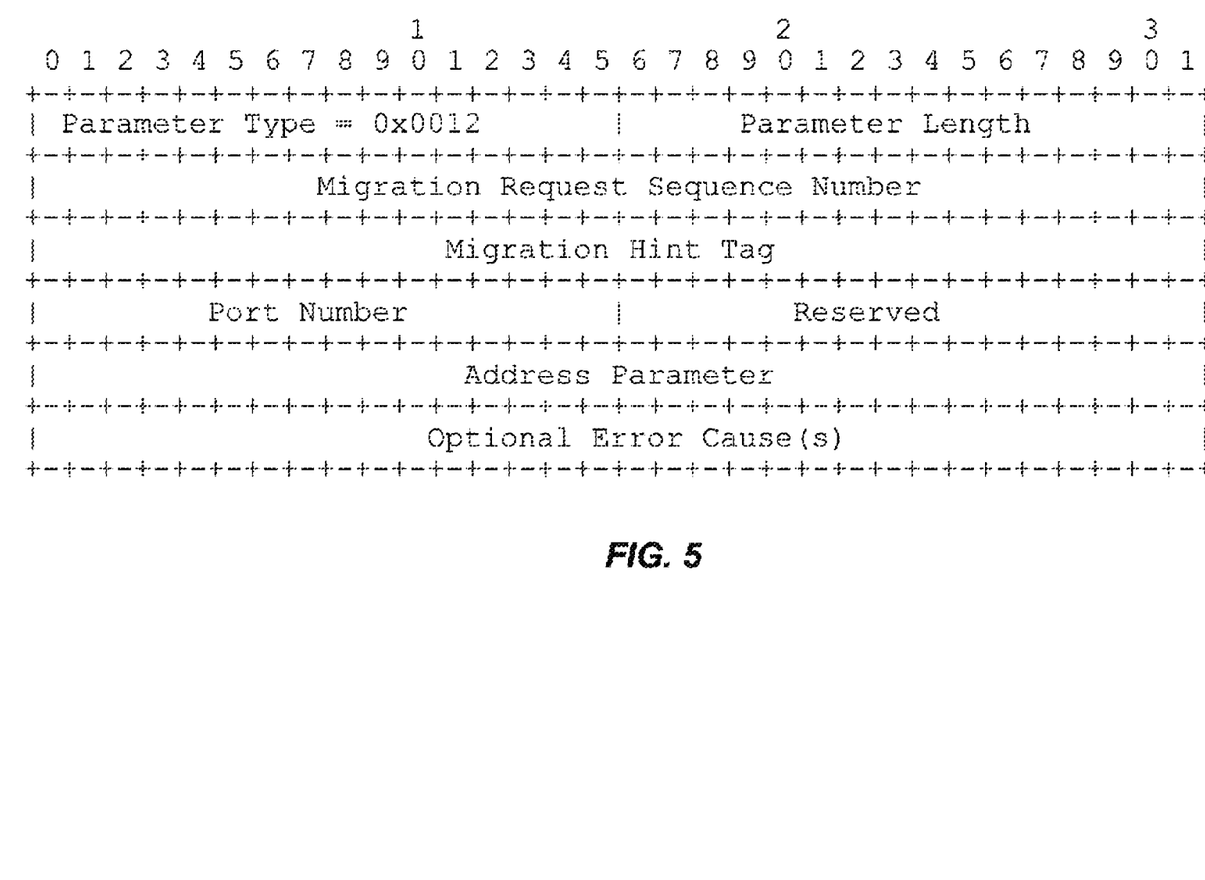
FIG. 5 illustrates an embodiment of a migration information parameter included in the SCTP MIGRATION chunk of FIG. 3.

FIG. 5 illustrates an embodiment of the migration information parameter. According to this embodiment, the first field is a 2 byte (unsigned integer) parameter type field which holds the IANA defined parameter type for the migration information parameter previously described herein. In one embodiment, the value is 0x0012. The second field is a 2 byte (unsigned integer) parameter length field which holds the length in bytes of the migration information parameter, including the parameter type and parameter length fields.

The next field is a 4 byte (unsigned integer) migration request sequence number field which is used to uniquely identify the migration request. The next field is a migration hint tag field which is 4 bytes and can be used by a load balancer or intermediary nodes to help determine the final destination of the new endpoint. A 2 byte (unsigned integer) port number field holds the port number for the new endpoint and an address parameter field contains an IP address for the new endpoint e.g. such as an IPv4 or IPv6 address parameter as specified in section 3.3.2.1 of RFC4960. An optional error cause(s) field can be provided with the migration information parameter. When reporting an error, the optional error cause(s) field is used to wrap one or more standard error causes normally found within an SCTP operational error or SCTP abort (as specified in RFC4960). In one embodiment, the error cause(s) field follows the format defined in section 3.3.10 of RFC4960.

Returning to FIG. 4, the next parameter type which can be included in the SCTP MIGRATION chunk is a migration challenge parameter. The migration challenge parameter contains data that can only be interpreted by the originator of the data and is used to challenge the sender of a MIGRATION-request chunk (FIG. 2, Step 210; FIG. 9, 310). This parameter is used inside the MIGRATION-verify and MIGRATION-verify-acknowledge chunks e.g. as shown in FIG. 2.

Figure 6:
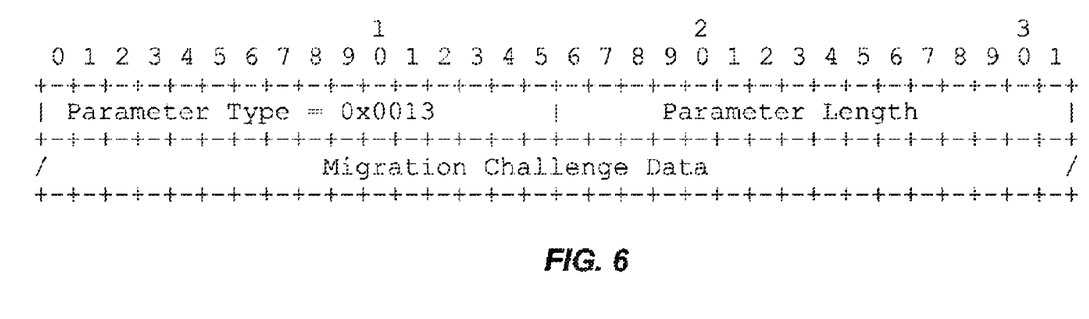
FIG. 6 illustrates an embodiment of a migration challenge parameter included in the SCTP MIGRATION chunk of FIG. 3.

FIG. 6 illustrates an embodiment of the migration challenge parameter. According to this embodiment, the first 2 byte (unsigned integer) parameter type field holds the IANA defined parameter type for the migration challenge parameter. In one embodiment, the value is 0x0013. The second field is a 2 byte (unsigned integer) parameter length field which holds the length in bytes of the migration challenge parameter, including the parameter type and parameter length fields. The third field is a variable length migration challenge data field which holds the actual migration challenge data. The migration challenge data is used in the same manner as the cookie state parameter inside the INIT ACK and COOKIE ECHO chunks specified in RFC4960.

Again returning to FIG. 4, the next parameter type which can be included in the SCTP MIGRATION chunk is a request ULP (upper layer protocol) state parameter. The request ULP state parameter is used to request the state of the controlling application at the migrating endpoint (FIG. 4, Step 240). This parameter may be used inside the SHUTDOWN chunk e.g. as shown in FIG. 2.

Figure 7:
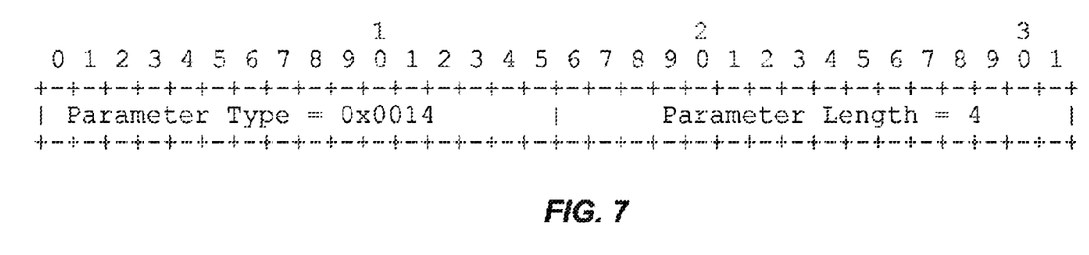
FIG. 7 illustrates an embodiment of a request ULP state parameter included in the SCTP MIGRATION chunk of FIG. 3.

FIG. 7 illustrates an embodiment of the request ULP state parameter. According to this embodiment, the first field is a 2 byte (unsigned integer) parameter type field which holds the IANA defined parameter type for the request ULP state parameter. In one embodiment, the value is 0x0014. The second field is a 2 byte (unsigned integer) parameter length field which holds the length in bytes of the request ULP state parameter and in one embodiment is fixed at 4.

Once again returning to FIG. 4, the next parameter type which can be included in the SCTP MIGRATION chunk is a ULP state cookie parameter. The ULP state cookie parameter contains data that can be interpreted by the application at the new end-point. This parameter may be used inside the MIGRATION-resume chunk and the SHUTDOWN ACK chunk e.g. as shown in FIG. 2.

Figure 8:
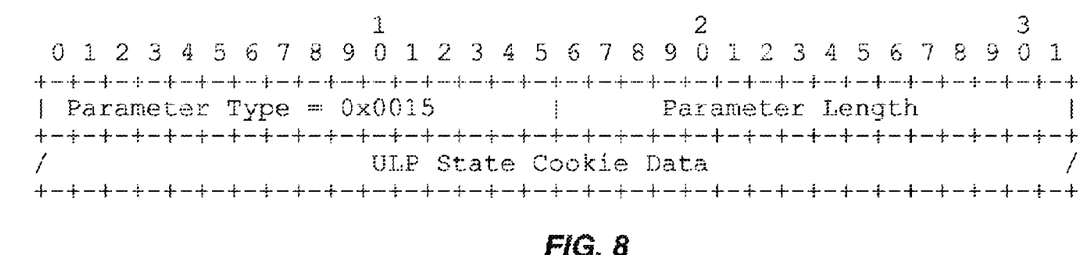
FIG. 8 illustrates an embodiment of a ULP state cookie parameter included in the SCTP MIGRATION chunk of FIG. 3.

FIG. 8 illustrates an embodiment of the ULP state cookie parameter. According to this embodiment, the first field is a 2 byte (unsigned integer) parameter type field which holds the IANA defined parameter type for the ULP state cookie parameter. In one embodiment, the value is 0x0015. The second field is a 2 byte (unsigned integer) parameter length field which holds the length in bytes of the ULP state cookie parameter, including the parameter type and parameter length fields. A third variable length field holds the actual ULP state cookie data. This data is not interpreted by SCTP and is passed on to the upper layer at the new end-point location.

Described next is an embodiment of seamlessly migrating an application at one SCTP endpoint of an association to another SCTP endpoint. The migration process is described first from the perspective of the migrating endpoint, and then from the perspective of the non-migrating endpoint and finally from the perspective of the new endpoint. The term 'migrating endpoint' refers to an endpoint at which an application is to be migrated to another endpoint, and the term 'non-migrating endpoint' refers to the corresponding (associated) endpoint at which the application is not to be migrated to another endpoint. Thus, the terms 'migrating' and 'non-migrating' refer to the state of the application at each endpoint and not to the actual physical location of an endpoint. For example, the client endpoint may be a mobile device which is physically moving but still considered to be non-migrating because the application is not migrated away from the client endpoint to another endpoint. In this case, the migrating endpoint may be a base station in a mobile communication network which serves the mobile client and is physically stationary. The application at the base station can be migrated to another base station which can better serve the mobile client e.g. in response to the mobile client moving locations, channel conditions or to balance the workload at the base stations.

In the following description, the endpoint requesting migration (i.e. the migrating endpoint) is referred to as MEP-o, the new migrated endpoint is referred to as MEP-n, and the non-migrating endpoint is referred to as NMEP e.g. as shown in FIG. 2.

Migrating Endpoint (MEP-o)

MEP-o determines the application is to be migrated at its end to another endpoint. In one embodiment, this determination is made responsive to a migrate primitive received from the upper layer requesting a migration to another location. In response, MPE-o creates a MIGRATION-request chunk which contains the migration information parameter as described previously herein e.g. as shown in FIGS. 2 and 3. The MIGRATION-request chunk is sent to NMEP, and MEP-o starts a Tx-migrate-verify timer and continues normal data chunk exchanges (FIG. 2, Step 200; FIG. 9, Step 300; FIG. 10, Step 400).

Upon receiving a MIGRATION-verify chunk from NMEP, the MEP-o verifies that the migration information parameter corresponds to the MIGRATION-request previously sent by MEP-o e.g. as shown in FIGS. 2, 4 and 5. If the migration information parameter corresponds to a valid migration request, MEP-o stops the Tx-migrate-verify timer, sends a MIGRATION-verify-acknowledge chunk to NMEP containing the migration challenge parameter received in the MIGRATION-verify chunk and starts a Tx-migrate timer e.g. as shown in FIGS. 2, 4 and 6. If the migration information parameter does not correspond to a valid migration request, the MEP-o silently discards the packet.

If NMEP and MEP-n successfully establish a new SCTP association in response to the initial MIGRATION-request first sent by MEP-o, MEP-o eventually receives a SHUTDOWN chunk from NMEP indicating the establishment of the new association e.g. as shown in FIG. 2. In response, MEP-o performs the normal shutdown of the association with NMEP as specified in section 9.2 of RFC4960] with the following modification. Before sending a SHUTDOWN ACK chunk to NMEP, if a request ULP state parameter was included in the SHUTDOWN chunk e.g. as shown in FIGS. 2 and 7, MEP-o requests its upper layer to provide a ULP state. MEP-o includes this state information as part of the ULP state cookie parameter added to the SHUTDOWN ACK chunk sent to NMEP e.g. as illustrated in FIGS. 2 and 8. The association is then closed between MEP-o and NMEP in response to a SHUTDOWN complete chunk received at MEP-o from NMEP e.g. as shown in FIG. 2.

In some cases, the MIGRATION-resume chunk with the migration information parameter received at MEP-o may contain the optional error cause(s) field e.g. as shown in FIGS. 5 and 9. In this case, MEP-n does not support the migration request or an error has occurred during the establishment of an association between MEP-n and NMEP (FIG. 9, Step 330). In either case, the optional error cause(s) field included in the MIGRATION-resume chunk indicates no association has been established between MEP-n and NMEP (FIG. 9, Step 340). In response, MEP-o verifies that the migration information parameter corresponds to the MIGRATION-request previously sent by MEP-o. If the migration information parameter corresponds to a valid migration request, MEP-o informs its upper layer that the migration was unsuccessful and removes the outstanding migration request (FIG. 9, Step 350). MEP-o also sends a MIGRATION-resume-acknowledge chunk containing the migration information parameter previously received in the MIGRATION-resume chunk so that MEP-o and NMEP resume their association e.g. as shown in FIG. 9. Otherwise, MEP-o sends a MIGRATION-resume-acknowledge chunk containing the migration information parameter received in the MIGRATION-resume chunk.

Upon receiving an ERROR chunk with an error cause parameter of 'unrecognized chunk type' indicating a MIGRATION-request chunk, MEP-o verifies that the migration information parameter inside the MIGRATION-request chunk of the ERROR chunk corresponds to the MIGRATION-request previously sent by MEP-o e.g. as shown in FIG. 10. If the migration information parameter corresponds to a valid migration request, MEP-o informs the upper layer that the migration was unsuccessful and removes the outstanding migration request (FIG. 9, Step 360). If the migration information parameter does not correspond to a valid migration request, MEP-o silently discards the ERROR chunk. Either way, the migration attempt fails at which point MEP-o may attempt to resume the association with NMEP to support the client application or take another course of action.

Non-Migrating Endpoint (NMEP)

Upon receiving a MIGRATION-request chunk from MEP-o, NMEP determines whether it supports the SCTP endpoint migration procedure e.g. as shown in FIGS. 2 and 10. If so, NMEP sends a MIGRATION-verify chunk containing the migration information parameter received in the MIGRATION-request chunk and a migration challenge parameter to MEP-o, and starts a Tx-migrate-verify timer e.g. as shown in FIGS. 2 and 4-6. The migration challenge parameter can be designed to continue the migration process upon NMEP receiving the MIGRATION-verify-acknowledge chunk from MEP-o.

Upon receiving the MIGRATION-verify-acknowledge chunk containing a valid migration challenge parameter, NMEP stops the Tx-migrate-verify timer, records that MEP-o is migrating and performs the normal establishment of an association with MEP-n as specified in section 5.1 of RFC4960] using the address and port number specified in the migration information parameter of the MIGRATION-request chunk e.g. as shown in FIGS. 2 and 5. If the MIGRATION-verify-acknowledge chunk received by NMEP contains an invalid migration challenge parameter, NMEP silently discards the chunk.

As part of the association establishment procedure with MEP-n, NMEP adds the migration information parameter to the INIT chunk sent to MEP-n e.g. as shown in FIG. 2. Preferably, NMEP does not bundle DATA chunks with the COOKIE ECHO chunk during the association establishment with MEP-n.

If the new association with MEP-n is successful, NMEP performs the normal shutdown of the association with MEP-o as specified in section 9.2 of RFC4960, with the following modifications e.g. as shown in FIG. 2. NMEP may accept new data from the upper layer, but this new data is not sent to the old endpoint (MEP-o). Instead, NMEP saves this data for transmission to the new endpoint (MEP-n). NMEP also adds a request ULP state parameter to the SHUTDOWN chunk e.g. as shown in FIGS. 2 and 7. If a ULP state cookie parameter was present in the SHUTDOWN ACK chunk, NMEP saves this parameter to be used in the MIGRATION-resume chunk sent to MEP-n e.g. as shown in FIGS. 2 and 8.

After the shutdown association is completed with MEP-o, NMEP resets its TSN to the initial TSN received from MEP-n, resets all stream SSNs to 0, and change its peer verification TAG to the I-TAG received from MEP-n e.g. as shown in FIG. 2 (FIG. 2, Step 260). NMEP also updates the list of peer end-point addresses and notifies the upper layer if there was a change to the list as compared to the list of addresses for MEP-o, and updates the peer (MEP-n) port number. NMEP sends a MIGRATION-resume chunk to MEP-n including the migration information parameter, and a ULP state cookie parameter if received in the SHUT-DOWN ACK chunk e.g. as illustrated in FIGS. 2, 5 and 8. NMEP also starts a Tx-migrate-resume timer.

Upon receiving a valid MIGRATION-resume-acknowledge chunk from MEP-n, NMEP stops the Tx-migrate-resume timer, removes any trace of the migration request and starts normal traffic with MEP-n beginning with the data that may have been buffered since the shutdown of the association with MEP-o e.g. as illustrated in FIG. 2 (FIG. 2, Step 280).

If the new association with MEP-n is not successful, NMEP sends a MIGRATION-resume chunk to MEP-o including the migration information parameter with the optional error cause(s) field indicating the migration was unsuccessful e.g. as illustrated in FIG. 9. NMEP also start a Tx-migrate-resume timer. Upon receiving a valid MIGRATION-resume-acknowledge chunk from MEP-o, NMEP stops the Tx-migrate-resume timer and removes any trace of the migration request.

If NMEP does not support the MIGRATION-request chunk, NMEP sends an ERROR chunk back to MEP-o with an error cause of 'unrecognized chunk type' e.g. as illustrated in FIG. 10 (FIG. 10, Step 410). NMEP does not support the SCTP migration in this case, and the MEP-o informs its upper layer that the migration was unsuccessful (FIG. 10, Step 420) and can maintain or terminate the association with NMEP.

New Migrated Endpoint (MEP-n)

Upon receiving an INIT chunk with a migration information parameter e.g. as shown in FIG. 2, the MEP-n that supports endpoint migration performs the normal establishment of an association as specified in section 5.1 of RFC4960. Preferably, MEP-n does not bundle DATA chunks with the COOKIE ACK chunk.

After association establishment, MEP-n enters the MIGRATING state with NMEP e.g. as shown in FIG. 2. The MIGRATING state can be entered into from a closed state by the receipt of a valid COOKIE ECHO chunk that contains an indication of the migration information parameter received in the original INIT chunk e.g. as shown in FIG. 2. MEP-n also defers the communication up notification to the upper layer until MEP-n receives a MIGRATION-resume chunk. MEP-n also start a Tx-migrating timer.

Upon receiving a MIGRATION-resume chunk, MEP-n performs the following procedures. If MEP-n is in the MIGRATING state, MEP-n enters the ESTABLISHED state and inform its upper layer that the migration was successful (including the ULP state cookie data if it was present in the MIGRATION-resume chunk) and resumes normal traffic with NMEP e.g. as shown in FIG. 2. The MIGRATING state can be exited and the ESTABLISHED state entered in response to the receipt of the MIGRATION-resume chunk. MEP-n also sends a MIGRATION-resume-acknowledge chunk back to the originator of the MIGRATION-resume chunk (i.e. NMEP) e.g. as shown in FIG. 2.

If MEP-n does not support SCTP endpoint migration, then upon receiving an INIT chunk with a migration information parameter, MEP-n sends an ABORT chunk with an error cause of 'unrecognized parameters' to NMEP e.g. as illustrated in FIG. 9 (FIG. 9, Step 330). The ABORT chunk causes NMEP to terminate the association establishment process with MEP-n and resume its association with MEP-o (FIG. 9, Step 340).

The following primitives can be added to the upper layer protocol (ULP) in accordance with the SCTP extensions and modifications described herein. The MIGRATE primitive can have the following format: MIGRATE (association id, port number, IP address, [migration hint tag])→result. This primitive allows the upper layer to initiate the migration of the current end-point to another location. Mandatory attributes for the MIGRATE primitive are: association id (local handle to the SCTP association); port number (the SCTP port number used by the endpoint at the new location); and IP address (the SCTP transport address used by the end-point at the new location). An optional attribute for the MIGRATE primitive is the migration hint tag which identifies data to be included in the migration information parameter of the INIT chunk to the new endpoint location.

If the migration can not complete successfully, migrating endpoint (MEP-o) receives an indication of the migration failure. In one embodiment, the following fields can be passed with the notification: association id (local handle to the SCTP association) and error info (indication of the cause of the migration failure. Also, the optional ULP state cookie data parameter can be added to the communication up notification specified in section 10.2 (D) of RFC4960. This parameter is optional and provided if included in the MIGRATION-resume chunk. The upper layer can use this information to synchronize itself to a known state.

When the association with the new endpoint (MEP-n) is completed, the association with the original endpoint (MEP-o) is shutdown (FIG. 2, Step 250). The SHUTDOWN chunk may include the ULP state request parameter as previously described herein. When all outgoing data has been acknowledged and incoming data delivered to the upper layer, SCTP requests the upper layer to provide any state information that the upper layer wants to be delivered to the new endpoint (MEP-n). In one embodiment, the following fields can be passed with the notification: association id (local handle to the SCTP association); buffer address (location where to store the ULP state cookie data); and buffer size (size of the storage at the buffer address location—this indicates the maximum size the ULP state cookie data can use). The upper layer fills in the data in the storage provided and responds to this notification with either n (positive integer specifying the actual size of the ULP state cookie data) or 0 (no ULP state cookie data provided). The upper layer preferably ensures that the ULP state cookie data is as small as possible in order to fit in the provided storage buffer. This constraint is defined in order for the SHUTDOWN ACK packet to fit inside the MTU of the transport layer.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the embodiments described herein are not limited by the foregoing description, nor are they limited by the accompanying drawings.

Instead, the embodiments described herein are limited only by the following claims and their legal equivalents.

What is claimed is:

1. A method of seamlessly migrating an application at one Stream Control Transmission Protocol (SCTP) endpoint of an association to another SCTP endpoint, the method comprising:
   determining the application is to be migrated from a first SCTP endpoint associated with a second SCTP endpoint to a third SCTP endpoint; and
   migrating the application from the first SCTP endpoint to the third SCTP endpoint at the SCTP layer without packet loss occurring as a result of the migration.

2. The method of claim 1, wherein migrating the application from the first SCTP endpoint to the third SCTP endpoint at the SCTP layer comprises:
   sending an SCTP migration request message from the first SCTP endpoint to the second SCTP endpoint which identifies the third SCTP endpoint;
   receiving an SCTP response message at the first SCTP endpoint which indicates whether the second-end point successfully established an SCTP association with the third SCTP endpoint in response to the SCTP migration request message; and
   terminating the SCTP association between the first and second SCTP endpoints if the second and third SCTP endpoints successfully established an SCTP association.

3. The method of claim 2, wherein the SCTP migration request message comprises an SCTP chunk including a first field indicating that the message is related to an SCTP migration, a second field specifying a type of SCTP migration action, a first parameter specifying a port number for the third SCTP endpoint and a second parameter specifying an IP address for the third SCTP endpoint.

4. The method of claim 2, further comprising:
   receiving an SCTP migration request verify message from the second SCTP endpoint which includes a verification parameter;
   comparing the verification parameter included in the SCTP migration request verify message to a verification parameter included in the SCTP migration request message previously sent to the second SCTP endpoint; and
   sending an SCTP migration request acknowledgement message to the second SCTP endpoint indicating whether the verification parameters match, and if so, that the second SCTP endpoint should attempt to establish an association with the third SCTP endpoint.

5. The method of claim 2, wherein terminating the SCTP association between the first and second SCTP endpoints if the second and third SCTP endpoints successfully established an SCTP association comprises:
   initiating a shutdown procedure at the first SCTP endpoint for the association with the second SCTP endpoint responsive to an SCTP shutdown chunk received at the first SCTP endpoint;
   sending an SCTP shutdown acknowledgment chunk to the second SCTP endpoint which acknowledges the shutdown procedure; and
   including state information about the application at the first SCTP endpoint in the SCTP shutdown acknowledgment chunk if the state information was requested in the SCTP shutdown chunk previously received at the first SCTP endpoint.

6. The method of claim 1, further comprising notifying the application at the first SCTP endpoint if the migration is unsuccessful.

7. The method of claim 1, wherein migrating the application from the first SCTP endpoint to the third SCTP endpoint at the SCTP layer comprises:
   receiving an SCTP migration request message at the second SCTP endpoint which includes migration information identifying the third SCTP endpoint;
   attempting to establish an association between the second and third SCTP endpoints responsive to the SCTP migration request message; and
   sending an SCTP response message to the first SCTP endpoint which indicates whether the second SCTP endpoint successfully established an SCTP association with the third SCTP endpoint in response to the SCTP migration request message.

8. The method of claim 7, wherein the SCTP response message comprises an SCTP chunk including a first field indicating that the message is related to an SCTP migration action.

9. The method of claim 8, wherein the SCTP chunk further includes a first parameter specifying the migration information included in the SCTP migration request message received at the second SCTP endpoint and a second parameter specifying verification information known to the first SCTP endpoint.

10. The method of claim 7, further comprising:
    sending an SCTP migration request verify message to the first SCTP endpoint which includes a verification parameter known to the first SCTP endpoint;
    receiving an SCTP migration request acknowledgement message at the second SCTP endpoint which indicates whether the verification parameter included in the SCTP migration request verify message matches a verification parameter included in the SCTP migration request message previously received at the second SCTP endpoint; and
    attempting to establish an association between the second and third SCTP endpoints if the SCTP migration request acknowledgement message indicates that the verification parameters match.

11. The method of claim 7, further comprising:
    sending an SCTP shutdown chunk to the first SCTP endpoint which indicates that the association between the first and second SCTP endpoints is to be terminated and which requests state information about the application at the first SCTP endpoint; and
    receiving an SCTP shutdown acknowledgment chunk at the second SCTP endpoint which acknowledges the shutdown procedure and which includes the requested state information about the application.

12. The method of claim 1, wherein migrating the application from the first SCTP endpoint to the third SCTP endpoint at the SCTP layer comprises:
    establishing an association between the second and third SCTP endpoints responsive to an SCTP INIT chunk received at the third SCTP endpoint which includes migration information identifying the third SCTP endpoint;
    entering a migrating state between the second and third SCTP endpoints after the association is established between the second and third SCTP endpoints; and
    transitioning from the migrating state to an established state between the second and third SCTP endpoints responsive to a migration resume chunk received at the third SCTP endpoint.

13. The method of claim 12, further comprising:
  informing the application at the third SCTP endpoint whether the migration is successful; and
  resuming normal traffic for the application between the second and third SCTP endpoints if the migration is successful.

14. A migrating Stream Control Transmission Protocol (SCTP) endpoint for supporting an application, the migrating SCTP endpoint comprising one or more processing circuits operable to:
  associate the migrating SCTP endpoint with a non-migrating SCTP endpoint to support the application;
  determine the application is to be migrated from the migrating SCTP endpoint to a third SCTP endpoint; and
  migrate the application from the migrating SCTP endpoint to the third SCTP endpoint at the SCTP layer without packet loss occurring as a result of the migration.

15. The migrating SCTP endpoint of claim 14, wherein the one or more processing circuits are operable to:
  send an SCTP migration request message to the non-migrating SCTP endpoint which identifies the third SCTP endpoint;
  process an SCTP response message received from the non-migrating SCTP endpoint which indicates whether the non-migrating endpoint successfully established an SCTP association with the third SCTP endpoint in response to the SCTP migration request message; and
  terminate the SCTP association with the non-migrating SCTP endpoint if the non-migrating SCTP endpoint and the third SCTP endpoint successfully established an SCTP association.

16. The migrating SCTP endpoint of claim 15, wherein the SCTP migration request message comprises an SCTP chunk including a first field indicating the message is related to an SCTP migration, a second field specifying a type of SCTP migration action, a first parameter specifying a port number for the third SCTP endpoint and a second parameter specifying an IP address for the third SCTP endpoint.

17. The migrating SCTP endpoint of claim 15, wherein the one or more processing circuits are operable to:
  process an SCTP migration request verify message received from the non-migrating SCTP endpoint which includes a verification parameter;
  compare the verification parameter included in the SCTP migration request verify message to a verification parameter included in the SCTP migration request message previously sent to the non-migrating SCTP endpoint; and
  generate an SCTP migration request acknowledgement message which indicates whether the verification parameters match, and if so, that the non-migrating SCTP endpoint should attempt to establish an association with the third SCTP endpoint.

18. The migrating SCTP endpoint of claim 15, wherein the one or more processing circuits are operable to:
  initiate a shutdown procedure with the non-migrating SCTP endpoint responsive to a received SCTP shutdown chunk indicating that the shutdown procedure is to be performed;
  generate an SCTP shutdown acknowledgment chunk acknowledging the shutdown procedure; and
  include state information about the application in the SCTP shutdown acknowledgment chunk if the state information was requested in the SCTP shutdown chunk.

19. The migrating SCTP endpoint of claim 14, wherein the one or more processing circuits are operable to notify the application at the migrating SCTP endpoint if the migration is unsuccessful.

20. A non-migrating Stream Control Transmission Protocol (SCTP) endpoint for supporting an SCTP application, the SCTP endpoint comprising one or more processing circuits operable to:
  associate the non-migrating SCTP endpoint with a migrating SCTP endpoint to support the application;
  receive a message indicating that the application is to be migrated from the migrating SCTP endpoint to a third SCTP endpoint; and
  establish an association with the third endpoint so that the application is migrated from the migrating SCTP endpoint to the third SCTP endpoint at the SCTP layer without packet loss occurring as a result of the migration.

21. The non-migrating SCTP endpoint of claim 20, wherein the one or more processing circuits are operable to:
  process a received SCTP migration request message which includes migration information identifying the third SCTP endpoint;
  establish an association with the third SCTP endpoint responsive to the SCTP migration request message; and
  generate an SCTP response message indicating whether an SCTP association is successfully established with the third SCTP endpoint.

22. The non-migrating SCTP endpoint of claim 21, wherein the SCTP response message comprises an SCTP chunk including a first field indicating that the message is related to an SCTP migration, a first parameter specifying the migration information included in the SCTP migration request message and a second parameter specifying verification information known to the migrating SCTP endpoint.

23. The non-migrating SCTP endpoint of claim 21, wherein the one or more processing circuits are operable to:
  generate an SCTP migration request verify message which includes a verification parameter known to the migrating SCTP endpoint;
  process an SCTP migration request acknowledgement message indicating whether the verification parameter included in the SCTP migration request verify message matches a verification parameter included in the SCTP migration request message; and
  establish an association with the third SCTP endpoint if the SCTP migration request acknowledgement message indicates that the verification parameters match.

24. The non-migrating SCTP endpoint of claim 21, wherein the one or more processing circuits are operable to:
  generate an SCTP shutdown chunk which indicates the association with the migrating SCTP endpoint is to be terminated and which requests state information about the application from the migrating SCTP endpoint; and
  process an SCTP shutdown acknowledgment chunk which acknowledges the shutdown procedure and which includes the requested state information about the application.

25. A Stream Control Transmission Protocol (SCTP) endpoint for supporting an SCTP application, the SCTP endpoint comprising one or more processing circuits operable to:
  receive a message indicating the application is to be migrated from a migrating SCTP endpoint associated with a non-migrating SCTP endpoint to the SCTP endpoint; and establish an association with the non-migrating endpoint so that the application is migrated from the migrating SCTP endpoint to the SCTP endpoint at the SCTP layer without packet loss occurring as a result of the migration.

26. The SCTP endpoint of claim 25, wherein the one or more processing circuits are operable to:
establish an association with the non-migrating SCTP endpoint responsive to an SCTP INIT chunk;
enter a migrating state with the non-migrating SCTP endpoint after the association is established with the non-migrating SCTP endpoint; and
transition from the migrating state to an established state with the non-migrating SCTP endpoint responsive to a received migration resume chunk.

27. The SCTP endpoint of claim 26, wherein the one or more processing circuits are operable to:
inform the application at the SCTP endpoint whether the migration is successful; and
resume normal traffic for the application with the non-migrating SCTP endpoint if the migration is successful.

\* \* \* \* \*